United States Patent
Cowden et al.

(10) Patent No.: US 7,480,862 B2
(45) Date of Patent: Jan. 20, 2009

(54) METHOD AND APPARATUS FOR PROVIDING INFORMATION REGARDING COMPUTER PROGRAMS

(75) Inventors: Jax B. Cowden, Dallas, TX (US); Kevin V. Dahlstrom, Plano, TX (US); Scott G. Eagle, Menlo Park, CA (US); Charles Gilbert, Sunnyvale, CA (US); Philip D. Hollrah, San Francisco, CA (US); Anthony G. Martin, Los Altos, CA (US); Jeffrey A. McFadden, Hillsborough, CA (US); Mark E. Pennell, Austin, TX (US); Marc E. Silverberg, Oakland, CA (US)

(73) Assignee: Claria Corporation, Redwood City, CA (US)

( * ) Notice: Subject to any disclaimer, the term of this patent is extended or adjusted under 35 U.S.C. 154(b) by 1448 days.

(21) Appl. No.: 09/993,904

(22) Filed: Nov. 27, 2001

(65) Prior Publication Data

US 2003/0101241 A1     May 29, 2003

(51) Int. Cl.
*G06F 3/00*     (2006.01)
*G06F 15/16*     (2006.01)
(52) U.S. Cl. ...................... 715/700; 709/203
(58) Field of Classification Search ................ 709/203, 709/217
See application file for complete search history.

(56) References Cited

U.S. PATENT DOCUMENTS

| | | | |
|---|---|---|---|
| 5,446,919 A | | 8/1995 | Wilkins |
| 5,708,709 A | * | 1/1998 | Rose ............................ 705/59 |
| 5,745,681 A | * | 4/1998 | Levine et al. ................ 709/200 |
| 5,758,111 A | * | 5/1998 | Shiratori et al. ............. 715/788 |
| 5,794,259 A | | 8/1998 | Kikinis |
| 5,835,722 A | | 11/1998 | Bradshaw et al. |
| 5,883,955 A | * | 3/1999 | Ronning ....................... 705/52 |
| 5,905,492 A | * | 5/1999 | Straub et al. ................. 715/744 |
| 5,943,478 A | | 8/1999 | Aggarwal et al. |

(Continued)

OTHER PUBLICATIONS

AnalogX Pow, Webpage [online]. C/net Downloads.com [retrieved on Oct. 3, 2001]. Retrieved from the Internet <URL http//download.cnet.com/downloads/0-3356748-100-915372_html>.

(Continued)

*Primary Examiner*—John Follansbee
*Assistant Examiner*—Kamal Divecha
(74) *Attorney, Agent, or Firm*—Sheppard, Mullin, Richter & Hampton LLP

(57) ABSTRACT

In one embodiment, a computer program blocks windows categorized as bad windows, while allowing windows categorized as good windows to be displayed. The computer program may categorize a window by consulting one or more lists. In one embodiment, a list may be updated from time to time to optimize the computer program and prevent program-obsolescence. Techniques for defeating a window-blocking mechanism are also disclosed. In one embodiment, a computer program detects if a window is of a type that offers a product to a user. If so, the computer program provides a separate window containing information regarding the product. In one embodiment, a computer program detects if a user has a need for the computer program. If so, the user is informed of the efficacy of the computer program, which is then offered to the user.

4 Claims, 12 Drawing Sheets

U.S. PATENT DOCUMENTS

| | | | | |
|---|---|---|---|---|
| 5,958,015 | A | | 9/1999 | Dascalu |
| 5,987,606 | A | | 11/1999 | Cirasole et al. |
| 5,996,011 | A | | 11/1999 | Humes |
| 5,999,740 | A | * | 12/1999 | Rowley ................... 717/173 |
| 6,011,537 | A | * | 1/2000 | Slotznick ................. 715/733 |
| 6,026,368 | A | | 2/2000 | Brown et al. |
| 6,065,056 | A | | 5/2000 | Bradshaw et al. |
| 6,101,510 | A | * | 8/2000 | Stone et al. ............. 715/513 |
| 6,154,738 | A | * | 11/2000 | Call ........................ 707/4 |
| 6,324,583 | B1 | * | 11/2001 | Stevens .................. 709/230 |
| 6,327,617 | B1 | * | 12/2001 | Fawcett .................. 709/219 |
| 6,477,550 | B1 | * | 11/2002 | Balasubramaniam et al. ........................ 715/513 |
| 6,601,041 | B1 | | 7/2003 | Brown et al. |
| 6,678,866 | B1 | * | 1/2004 | Sugimoto et al. ......... 715/203 |
| 6,826,546 | B1 | * | 11/2004 | Shuster ..................... 705/52 |
| 6,958,759 | B2 | * | 10/2005 | Safadi et al. .............. 345/660 |
| 6,968,507 | B2 | * | 11/2005 | Pennell et al. ............. 715/781 |
| 6,973,478 | B1 | * | 12/2005 | Ketonen et al. ........... 709/203 |
| 7,162,739 | B2 | * | 1/2007 | Cowden et al. ............ 726/22 |
| 2002/0002538 | A1 | * | 1/2002 | Ling ......................... 705/41 |
| 2002/0007309 | A1 | * | 1/2002 | Reynar ...................... 705/14 |
| 2002/0122065 | A1 | * | 9/2002 | Segal et al. ................ 345/783 |
| 2003/0028870 | A1 | * | 2/2003 | Weisman et al. ........... 717/178 |
| 2003/0154168 | A1 | * | 8/2003 | Lautenbacher ............... 705/51 |

OTHER PUBLICATIONS

Pop-up stopper, Webpage [online]. C/net Downloads.com [retrieved on Oct. 3, 2001]. Retrieved from the Internet <URL:http//download.cnet.com/downloads/0-10059-100-6803957_html>.

Advertising Killer, Webpage [online]. C/net Downloads.com [retrieved on Oct. 3, 2001]. Retrieved from the Internet <URL.http//download.cnet.com/downloads/0-10059-100-1539520_html>.

PopUp Killer, Webpage [online]. C/net Downloads.com [retrieved on Oct. 3, 2001]. Retrieved from the Internet <URL:http//download.cnet.com/downloads/0-10059-100-7253644.html>.

AdsOff, Webpage [online]. C/net Downloads.com [retrieved on Oct. 3, 2001]. Retrieved from the Internet <URL:http//download.cnet.com/downloads/0-10059-100-912651.html>.

InterMute, Webpage [online]. C/net Downloads.com [retrieved on Oct. 3, 2001]. Retrieved from the Internet <URL:http//download.cnet.com/downloads/0-10059-100-906599_html>.

CrushPop 2000, Webpage [online]. www.32bit.com [retrieved on Oct. 4, 2001]. Retrieved from the Internet <URL.http//32bit.com/software/listings/Internet/Special/_180P/13794_html>.

PopNot, Webpage [online]. C/net Downloads.com [retrieved on Oct. 4, 2001]. Retrieved from the Internet <URL.http//download.cnet.com/downloads/0-10059-100-5112702.html>.

Mr. KillAd, Webpage [online]. C/net Downloads.com [retrieved on Oct. 4, 2001]. Retrieved from the Internet <URL.http//download cnet_com/downloads/0-10059-100-895339_html>.

AllGone. Webpage [online]. C/net Downloads.com [retrieved on Oct. 4, 2001]. Retrieved from the Internet <URL:http//download cnet_com/downloads/0-10068-100-2915974_html>.

Marcebra Net. Webpage [online]. C/net Downloads.com [retrieved on Oct. 4, 2001]. Retrieved from the Internet <URL http//download_cnet_com'downloads_0-3364666-'00-5210875_html>.

Ad Muncher. Webpage [online]. C/net Downloads.com [retrieved on Oct. 4, 2001]. Retrieved from the Internet <URL http/_download cnet.com.downloads:0-3356748-100-2750044_html>.

Close Popup. Webpage [online]. C/net Downloads.com [retrieved on Oct. 4, 2001]. Retrieved from the Internet <URL http//download_cnet_com/downloads.0-10059-100-905799_html>.

Popki Popup Closer 1.4, Webpage [online]. WebAttack.com [retrieved on Oct. 4, 2001]. Retrieved from the internet <URL http:/www_webattack_com:getpopki_shtml>.

NoPops 1.1. Webpage [online]. WebAttack.com [retrieved on Oct. 4, 2001]. Retrieved from the Internet <URL.http//www_webattack.com/get/nopops.shtml>.

AdSubract SE, Webpage [online]. C/net Downloads.com [retrieved on Oct. 4, 2001]. Retrieved from the Internet <URL.http//download.cnet.com/downloads/0-3356727-100-5963713_html>.

NoAds 2000.6.30.1, Webpage [online]. south bay software [retrieved on Oct. 4, 2001]. Retrieved from the Internet <URL:http//www_southbaypc.com/NoAds_html>.

Surf In Peace 2.01, Webpage [online]. WebAttack.com [retrieved on Oct. 4, 2001]. Retrieved from the Internet <URL.http//www_webattack.com:get.sip_shtml>.

Black List, Webpage [online]. C/net Downloads.com [retrieved on Oct. 4, 2001]. Retrieved from the Internet <URL.http//download_cnet.com/downloads.0- 10059-100-902347_html>.

Ad Close, Webpage [online]. C/net Downloads.com [retrieved on Oct. 4, 2001]. Retrieved from the Internet <URL http//download_cnet.com/downloads/0-10059-100-915154.html>.

Popup Hunter, Webpage [online]. C/net Downloads.com [retrieved on Oct. 4, 2001]. Retrieved from the Internet <URL:http//download.cnet_com/downloads.0-10059-100-1451171_html>.

Nagger, Webpage [online]. C/net Downloads.com [retrieved on Oct. 4, 2001]. Retrieved from the Internet <URL.http//download.cnet com/downloads/0-3356748-100-2497932_html>.

Web Magician, Webpage [online]. RocketDownLoad.com [retrieved on Oct. 4, 2001]. Retrieved from the Internet <URL http/-www_rocketdownload_com/Details:late_webmag_html>.

AdPurger, Webpage [online]. C/net Downloads.com [retrieved on Oct. 4, 2001]. Retrieved from the Internet <URL.http//download.cnet.com/downloads/0-10068-100-5067717_html>.

Paraben's AdStopper, Webpage [online]. C/net Downloads.com [retrieved on Oct. 4, 2001]. Retrieved from the Internet <URL http//download_cnet_com:downloads:0-10059-100-2643648_html>.

Banner Zapper, Webpage [online]. C/net Downloads.com [retrieved on Oct. 4, 2001]. Retrieved from the Internet <URL http//download_cnet.com:downloads:0-3356727-100-6384811_html>.

AdDelete, Webpage [online]. C/net Downloads.com [retrieved on Oct. 4, 2001]. Retrieved from the Internet <URL:http//download.cnet.com/downloads/0-10059-100-7003126_html>.

Zero Popup, Webpage [online]. C/net Downloads.com [retrieved on Oct. 4, 2001]. Retrieved from the Internet <URL:http//download.cnet.com/downloads/0-3356748-100-7163307_html>.

PopUp Eraser, Webpage [online]. C/net Downloads.com [retrieved on Oct. 4, 2001]. Retrievrd from the Internet <URL:http//download.cnet.com/downloads/0-10059-100-6322841.html>.

PopKill, Webpage [online]. C/net Downloads.com [retrieved on Oct. 4, 2001]. Retrieved from the Internet <URL:http//download.cnet.com/downloads:0-10059-100-6967054_html>.

PopupDummy, Webpage [online]. C/net Downloads.com [retrieved on Oct. 4, 2001]. Retrieved from the Internet <URL http//download_cnet_com/downloads_0-10059-100-6943327_html>.

PopUp Smasher, Webpage [online]. C/net Downloads.com [retrieved on Oct. 4, 2001]. Retrieved from the Internet <URL:http//download_cnet_com.downloads/0-3364664-100-7209048_html>.

BanPopup, Webpage [online]. C/net Downloads.com [retrieved on Oct. 4, 2001]. Retrieved from the Internet <URL:http//download_cnet_com:downloads.0-10059-100-6901908_html>.

Close Popup 4.0, Webpage [online]. Take A Hike Software [retrieved on Oct. 4, 2001]. Retrieved from the Internet <URL http//www_ryanware_com:close_popup_ntml>.

CobraSoft PopStop, Webpage [online]. C/net Downloads.com [retrieved on Oct. 4, 2001]. Retrieved from the Internet <URL http:/download_cnet_com.downloads-0-10068-100-6926765.html>.

Adextinguisher-Introduction and News Section. Webpage [online][retrieved on Oct. 4, 2001]. Retrieved from the Internet URL http_adext_magenst_net.

Compare Prices and Read Reviews on AdsOff! Epenions.com. Webpage [online]; Jan. 21, 2001. Obtained from corresponding International Application PCT Search Report.

PCT International Search Report for application No. PCT/US02/35981, 3 sheets; mailed Apr. 4, 2003.

* cited by examiner

METHOD AND APPARATUS FOR PROVIDING INFORMATION REGARDING COMPUTER PROGRAMS

BACKGROUND OF THE INVENTION

1. Field of the Invention

This invention relates generally to computer systems, and more particularly to detection and processing of windows.

2. Description of the Background Art

A computer network couples various remotely located computers together to allow them to exchange information. On the Internet, for example, a user with a personal computer and a web browser can access a remotely located web server computer. The web server computer serves (i.e., delivers) content to a window in the personal computer. The web server computer may include web pages containing information that is of interest to the user. The web server computer may also include downloadable computer programs.

A typical commercially-operated web server on the Internet includes some form of advertising. The advertising may be for goods or services. The advertising may also be non-product related (e.g., "vote for John Doe"). Regardless of their message, these advertisements provide revenue to the web server operator. Thus, not satisfied with just having advertisements on a web page, operators have come up with various ways of displaying advertisements on a user's computer screen. Needless to say, advertisements abound on the Internet.

One way of displaying advertisements is via a separate window. This separate window is commonly referred to as a "pop-up" if displayed on top of other windows, or a "pop-under" if displayed under other windows. Pop-ups and pop-unders appear on a user's screen when the user navigates to (i.e., visits) a web server containing them; along with the usual web page content, the web server also downloads to the user's computer HTML (Hypertext Markup Language) code for generating a pop-up and/or pop-under. Users often find pop-ups annoying because they tend to appear unexpectedly and in the middle of the screen. Some users have accepted pop-ups as an unavoidable nuisance on the Internet, and just instinctively remove them as soon as they appear. Pop-unders, which don't become visible to the user until windows on top of them have been removed, are no less annoying.

Computer programs have been developed to prevent pop-ups and pop-unders from appearing on a computer screen. Such computer programs are available from commercial software developers (e.g., InterMute), sources of freeware, and various web sites on the Internet including download.com, adext.magenet.net, adsubtract.com, iconlabs.net, 32 bit.com, etc. However, these computer programs either get rid of too many or too little pop-ups and pop-unders.

Web server operators and their partners have also come up with various ways of offering downloadable computer programs to users. One way of offering a computer program to a user is to present the user a dialog box explaining the function of the program, and a button or a hyperlink for downloading the program to the user's computer. Aside from the dialog box, the user typically has no other immediate source of information regarding the program, and is thus at the mercy of the web server operator or its partner.

SUMMARY

The present invention relates to an improved technique for processing windows. In one embodiment, a computer program includes components for detecting the occurrence of a new window, determining the type of the window, and performing actions depending on the type of the window.

In one embodiment, a computer program blocks windows categorized as bad windows, while allowing windows categorized as good windows to be displayed. In one embodiment, the computer program categorizes windows by consulting one or more lists. A list may include a set of rules for determining whether a window is a bad window or a good window. A list may also include a set of domain names where window-blocking is not performed. In one embodiment, a list may be updated from time to time to optimize the computer program and prevent program-obsolescence. Techniques for defeating a window-blocking mechanism are also disclosed.

In one embodiment, a computer program detects if a window is of a type employed to offer a product to a user. If so, the computer program provides a separate window containing information regarding the product; thus, providing the user additional information that she can use in deciding whether or not to get the product.

In one embodiment, a computer program detects if a user has a need for the computer program. If so, the user is informed of the efficacy of the computer program, which is then offered to the user. Offering the computer program to the user at a time when the user has a need for it increases the likelihood that the user will accept the program.

These and other features and advantages of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of computer systems, components, computer programs, and/or methods, to provide a thorough understanding of embodiments of the invention. One skilled in the art will recognize, however, that the invention can be practiced without one or more of the specific details, or with other computer systems, components, computer programs, methods, and/or the like. In other instances, well-known details are not described to avoid obscuring aspects of the invention.

In the present disclosure, the term "window" is used to refer to any mechanism for presenting information to a user. Thus, the term "window" also includes message boxes, dialog boxes, text boxes, banners, etc. A window may be associated with a web browser, or may be generated as a result of receiving information from another computer over a computer network or from a local computer program. Also, "computer program" or "program" refers to a set of computer-readable program code; "computer-readable program code" refers to lines of computer instructions written in a programming language. As can be appreciated, a computer program may also be equivalently implemented in hardware or firmware.

In the present disclosure, the term "list" is used to refer to a group of information. A list may be a separate module of a computer program (e.g., a text data file) or embedded in a computer program. When implemented as a separate module, a list may be updated by installing a new list. A list embedded in a computer program may be updated by installing a new computer program. A list may be in any computer-readable format or data structure.

Computing Environment

Figure 1:
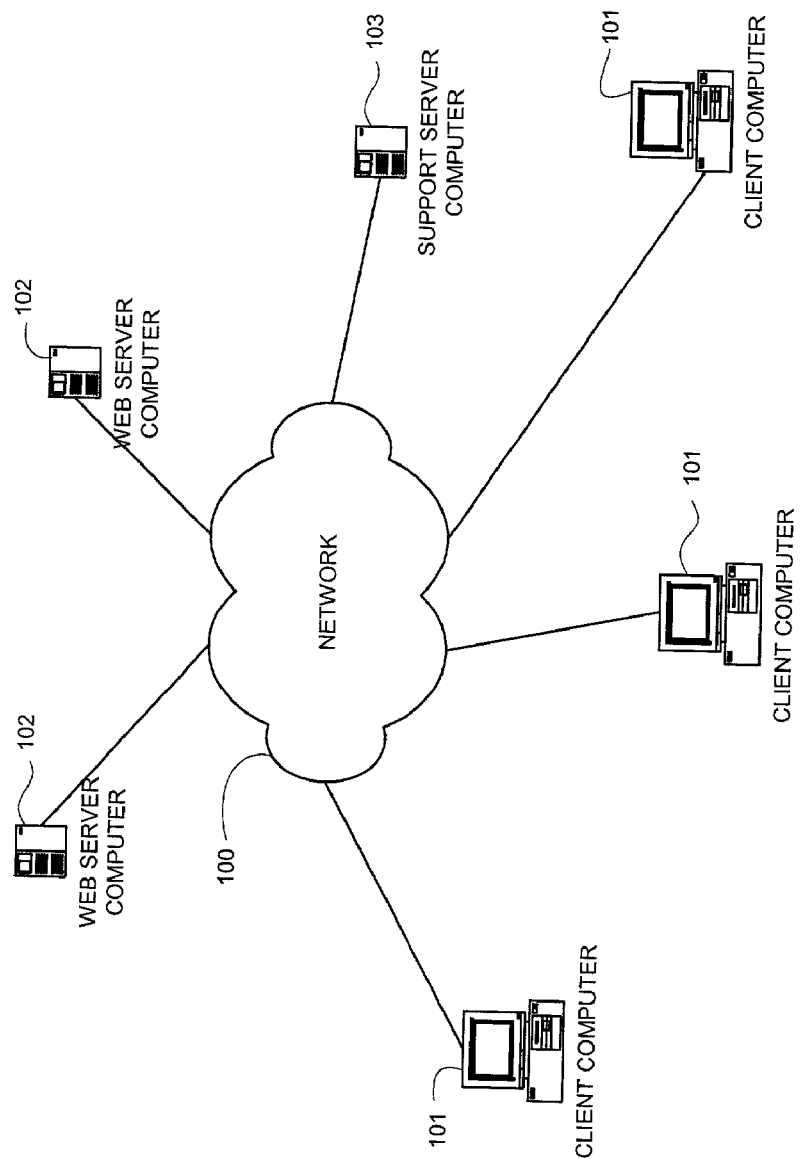
FIG. 1 shows a schematic diagram of a computer network in accordance with an embodiment of the present invention.

Referring now to FIG. 1, there is shown a schematic diagram of a computer network in accordance with an embodiment of the present invention. A network 100 includes one or more client computers 101, one or more web server computers 102, one or more support server computers 103, and other computers not shown. Intermediate nodes such as gateways, routers, bridges, Internet service provider networks, public-switched telephone networks, proxy servers, firewalls, etc. are not shown for clarity. In the embodiment of FIG. 1, network 100 includes the Internet; however, any type of computer network may also be used. Computers may be coupled to network 100 using any type of connection without detracting from the merits of the present invention.

A client computer 101 is typically, but not necessarily, a personal computer such as those running the Microsoft Windows™, Apple Macintosh™, Linux etc. operating systems. A user employs a suitably equipped client computer 101 to get on network 100 and access computers coupled thereon. For example, a client computer 101 may be used to access web pages from a web server computer 102. It is to be noted that the term "computer" includes any type of information processing device such as personal digital assistants, digital telephones, wireless terminals, etc.

A web server computer 102 may be a web site containing information designed to attract users browsing on the Internet. A web server computer 102 may also include advertisements, downloadable computer programs, and products (i.e., goods and services) available for online purchase.

A support server computer 103 may also be a web site. Additionally, a support server computer 103 includes files and downloadable computer programs for supporting, updating, or maintaining computer programs on a client computer 101.

Web server computers 102 and support server computers 103 are typically, but not necessarily, server computers such as those available from Sun Microsystems, Hewlett-Packard, International Business Machines, etc. A client computer 101 communicates with a web server computer 102 or a support server computer 103 using client-server protocol. Client-server computing is well known in the art and will not be further described here.

Figure 2:
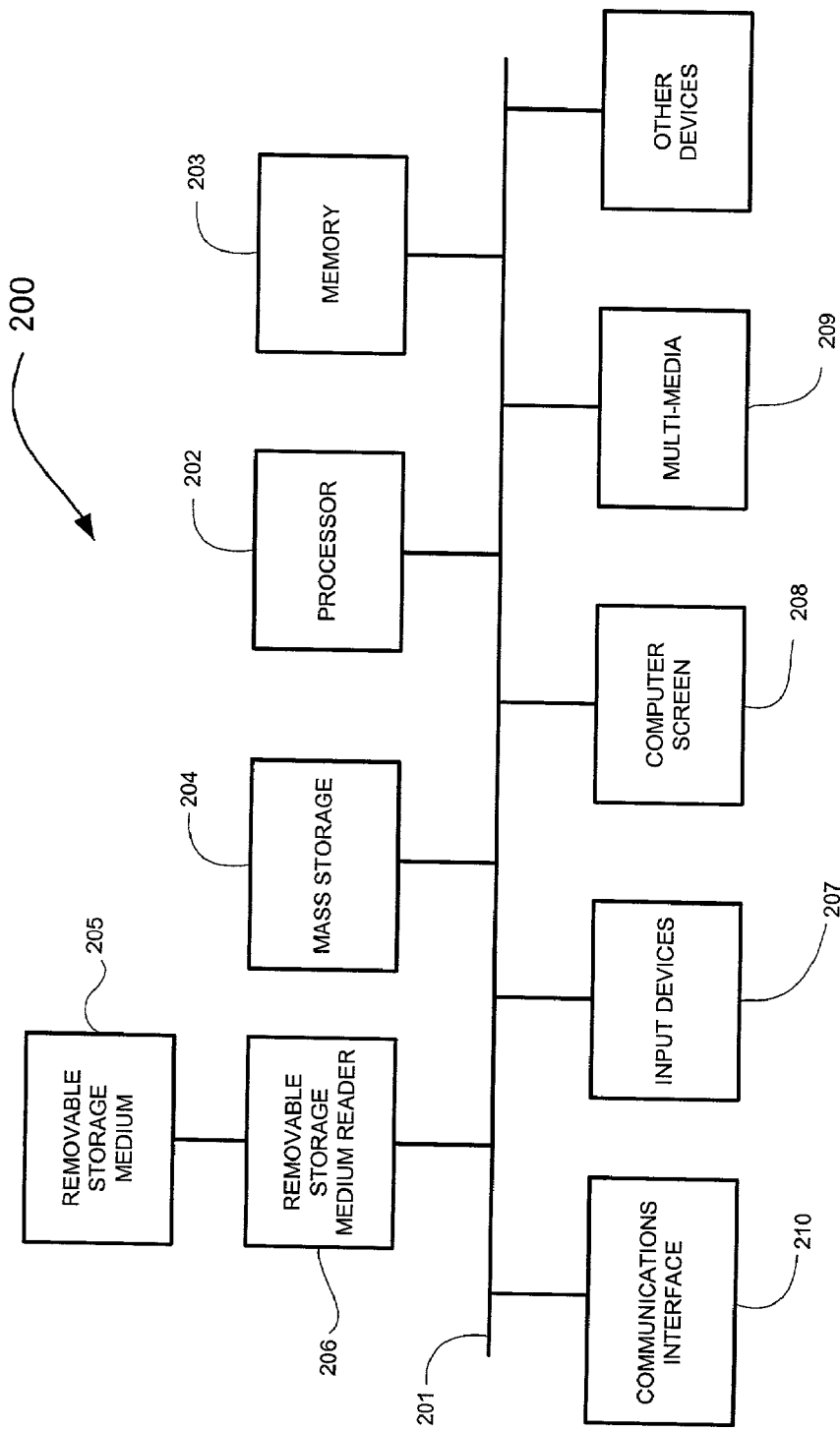
FIG. 2 shows a schematic diagram of a computer in accordance with an embodiment of the present invention.

Referring now to FIG. 2, there is shown a schematic diagram of a computer 200 in accordance with an embodiment of the present invention. As can be appreciated, a computer 200 may be utilized as a client computer or a server computer depending on configuration. A computer 200 includes a processor 202, a memory 203, a mass storage device 204, a removable storage medium 205, a removable storage medium reader 206, input devices 207, computer screen 208, multimedia devices 209, a communications interface 210, and other devices not specifically shown. The just mentioned components are coupled to a bus 201, which may be a single contiguous bus or a network of buses. As can be appreciated, the components of a computer 200 may be integrated into one or more devices (e.g., as components of a chipset), or implemented as separate devices.

A processor 202 may be any type of computer processor such as the Intel Pentium™, Power PC™, AMD Athlon™, Sun SPARC™, and like processors. A processor 202 executes computer-readable program code stored in a memory 203, which may be any type of computer memory. A memory 203 may comprise one or more physical memories such as SRAM, DRAM, ROM, EEPROM, Flash, and the like. A memory 203 may also comprise one or more virtual memory locations such as a mass storage device location mapped as physical memory, for example.

A mass storage 204 may be any type of storage device capable of storing computer data (e.g., program code, files) such as magnetic disk drives, optical drives, and the like. Computer-readable program code and associated data may be loaded from a mass storage 204 and into a memory 203. Computer-readable program code and associated data may also be loaded from a removable storage medium 205 using a removable storage medium reader 206. Examples of removable storage media 205 include floppy disks, CD-ROMs, smart cards, flash memories, PCMCIA cards, DVDs, etc.

Input devices 207 allow a user to enter data into a computer 200. Examples of an input device 207 include a keyboard, mouse, trackball, touch pad, joystick, etc. A computer screen 208 may be any type of device capable of displaying information such as a cathode-ray tube (CRT), flat-panel, LCD, TFT, and the like. A multi-media device 209 allows the user to work with rich media. Examples of multi-media devices include sound cards, microphones, scanners, video processors, speakers, etc.

A computer 200 is coupled to a computer network such as network 100 via a communications interface 210. A communications interface 210 may be any type of communications device for coupling a computer to a computer network. A communications interface 210 may be a modem, network adapter, Ethernet card, a wireless transceiver, etc.

A Window-Blocking Computer Program

Figure 3:
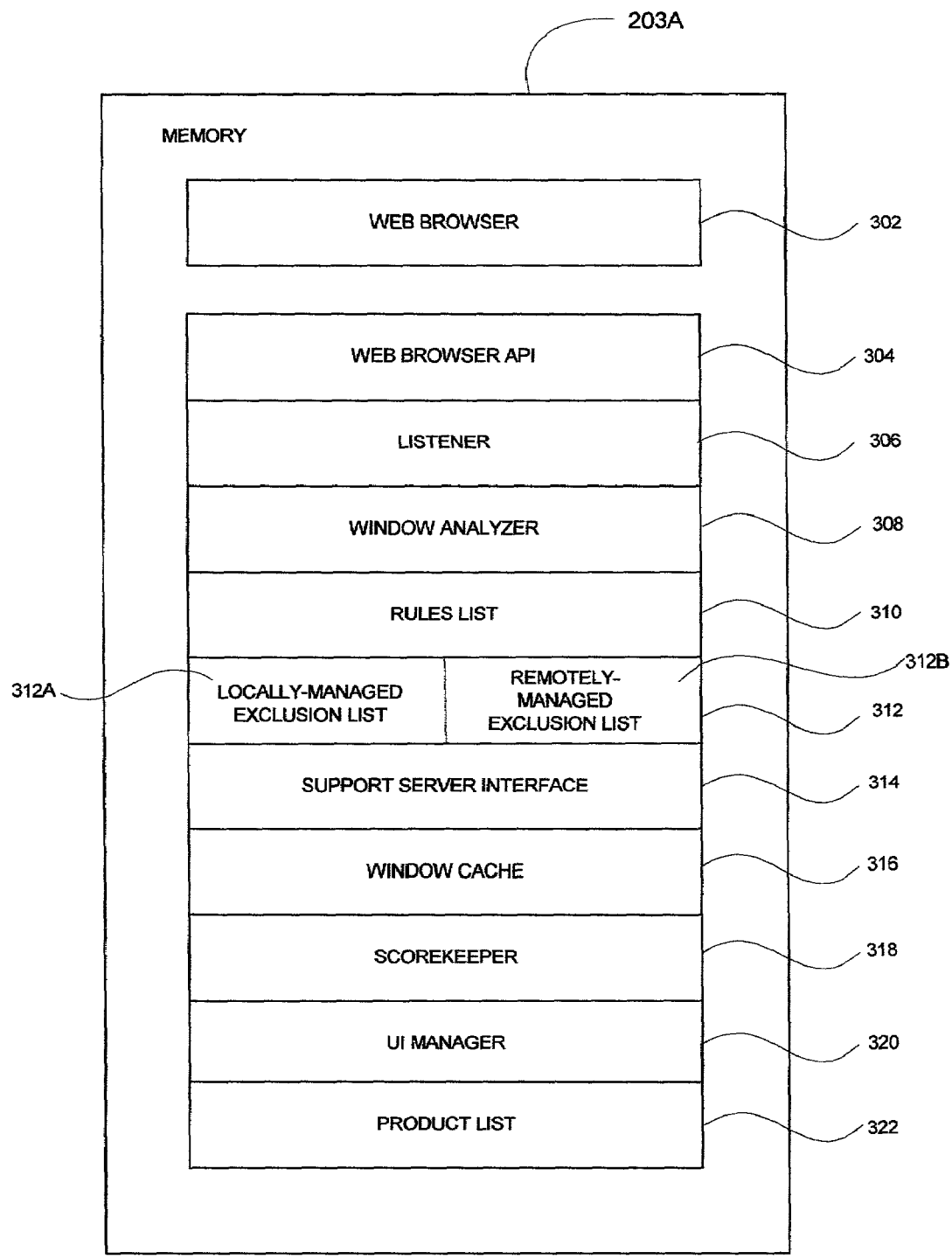
FIG. 3 shows a schematic diagram of a computer memory configured in accordance with an embodiment of the present invention.

Referring now to FIG. 3, there is shown a schematic diagram of a memory 203A of a client computer 101 configured in accordance with an embodiment of the present invention. A memory 203A is a specific embodiment of a memory 203 depicted in FIG. 2. In the embodiment of FIG. 3, a memory 203A is configured to include the following components: web browser 302, web browser applications programming interface (API) 304, listener 306, window analyzer 308, rules list 310, exclusion list 312, support server interface 314, window cache 316, score keeper 318, user interface (UI) manager 320, and product list 322. As can be appreciated, the components of a memory 203A may be embodied in a single program module or in multiple program modules. Also, the components of a memory 203A may be incorporated as part of a window-blocking computer program; the window-blocking computer program may be downloaded from a server computer or distributed on removable storage media.

A web browser 302 includes computer-readable program code for getting a web page from a web server, and displaying its content on a computer screen. Web browser 302 may be any type of web browser or web client. Examples of a web browser 302 include the Netscape Navigator™ and Microsoft Internet Explorer™ web browsers.

Figure 4:
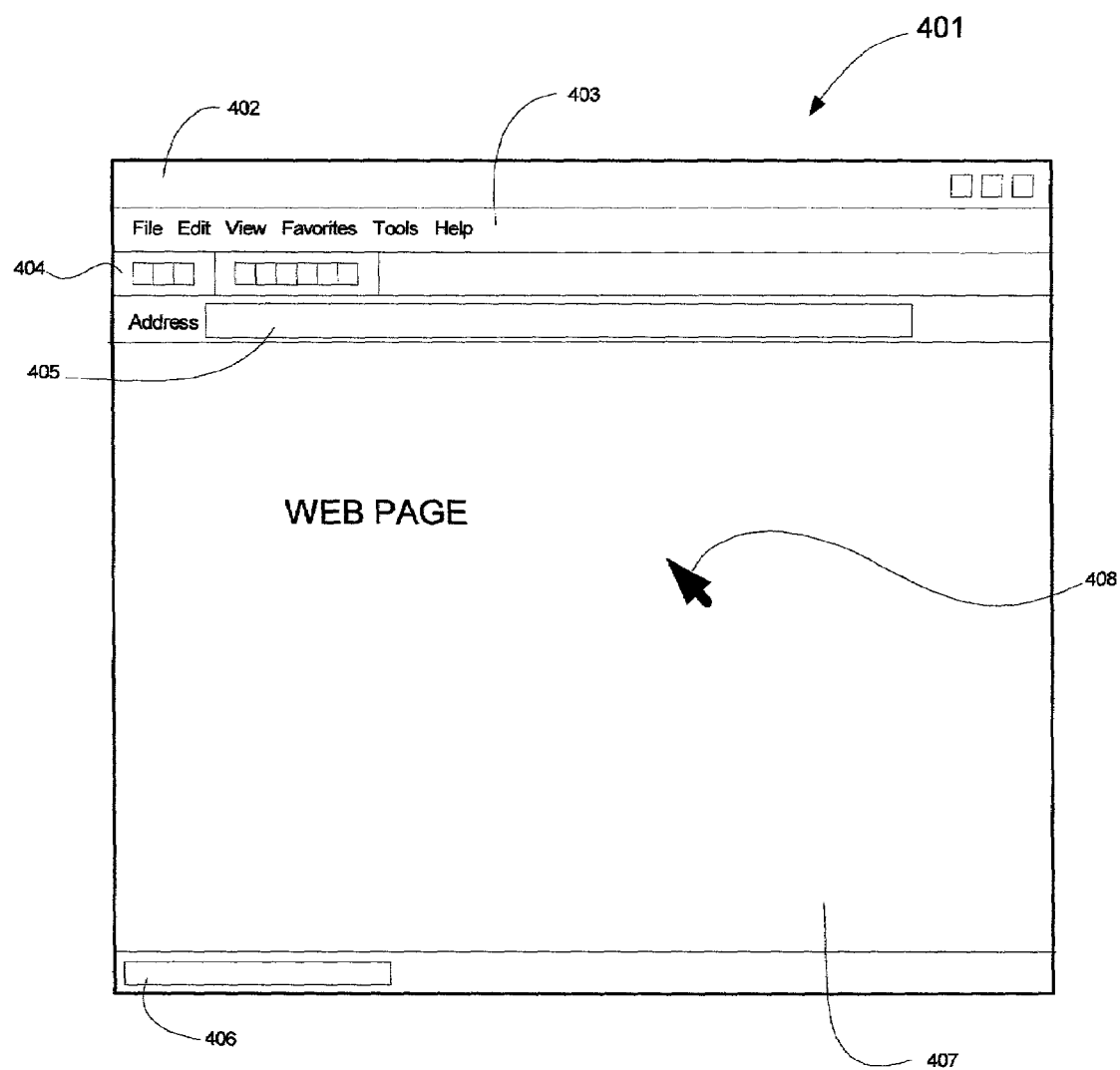
FIG. 4 shows a schematic representation of a web browser.

FIG. 4 schematically illustrates an example browser window 401 of a web browser 302. The browser window that a user normally employs for navigation, such as browser window 401, is also referred to herein as a "main browser window". Browser window 401 includes a title bar 402 for displaying the title of a web page 407. A menu bar 403 includes pull down menus for various functions, while a tool bar 404 provides shortcuts to various functions. An address window 405 displays the uniform resource locator (URL) of a web page 407. A status bar 406 displays various status information. For example, status bar 406 displays the current activity of web browser 302 such as when it is trying to find a web server identified by a URL, whether it is connected to the web server, whether it is getting web pages from the web server, etc. As another example, the URL pointed to by a hyperlink may be displayed on status bar 406 by placing a cursor 408 on the hyperlink.

Referring back to FIG. 3, a web browser API 304 includes computer-readable program code for communicating with web browser 302. Web browser API 304 allows various components of memory 203A to send commands, which are also known as browser methods, to web browser 302. Examples of commands that may be sent to web browser 302 include commands to open a new window, close a window, notify a listener 306 of the occurrence of certain events, provide the attributes of a window, provide the information displayed on a status bar, and redirect data from one window to another.

A listener 306 includes computer-readable program code for receiving browser event notifications from web browser 302. In one embodiment, listener 306 receives a browser event notification when the status bar of web browser 302 changes or when a new window is opening up. Listener 306 further receives browser event notifications of where the new window is navigating to (e.g., going to www.buynow.com) and where the new window ended up (e.g., ended up in www.discountstore.com).

A window analyzer 308 includes computer-readable program code for determining whether a window is a "good window" or a "bad window." Examples of good windows include those initiated by a user, whereas examples of bad windows include pop-ups and pop-unders. Window analyzer 308 blocks bad windows, while allowing good windows to be displayed. In one embodiment, window analyzer 308 consults a rules list 310 to determine if a window is a good window or a bad window. Rules list 310 may be included in a text file stored in a mass storage device and then loaded into memory 203A, for example. Rules list 310 may be in any computer-readable format or data structure. Advantageously, rules list 310 is implemented as a separate module so that it may be updated without having to update the entirety of a computer program employing rules list 310.

The rules in rules list 310 may be based on a window's characteristics: the window's attributes, whether it was initiated by a program or by the user, where it is navigating to and where it ended up, it's fields (e.g., login field, password field), how many times it tried to be displayed, where on the screen it is to be displayed, etc. Window analyzer 308 obtains a window's characteristics from web browser 302 by invoking browser methods made possible by web browser API 304.

In one embodiment, rules list 310 includes a set of rules for identifying good and bad windows. The rules may be updated from time to time by downloading a new set of rules from a support server computer 103, for example. This allows window analyzer 308 to be updated in order to detect new kinds of bad windows. This further allows window analyzer 308 to be optimized; the rules may be fine tuned to block the right amount and type of window for a given application.

Figure 5:
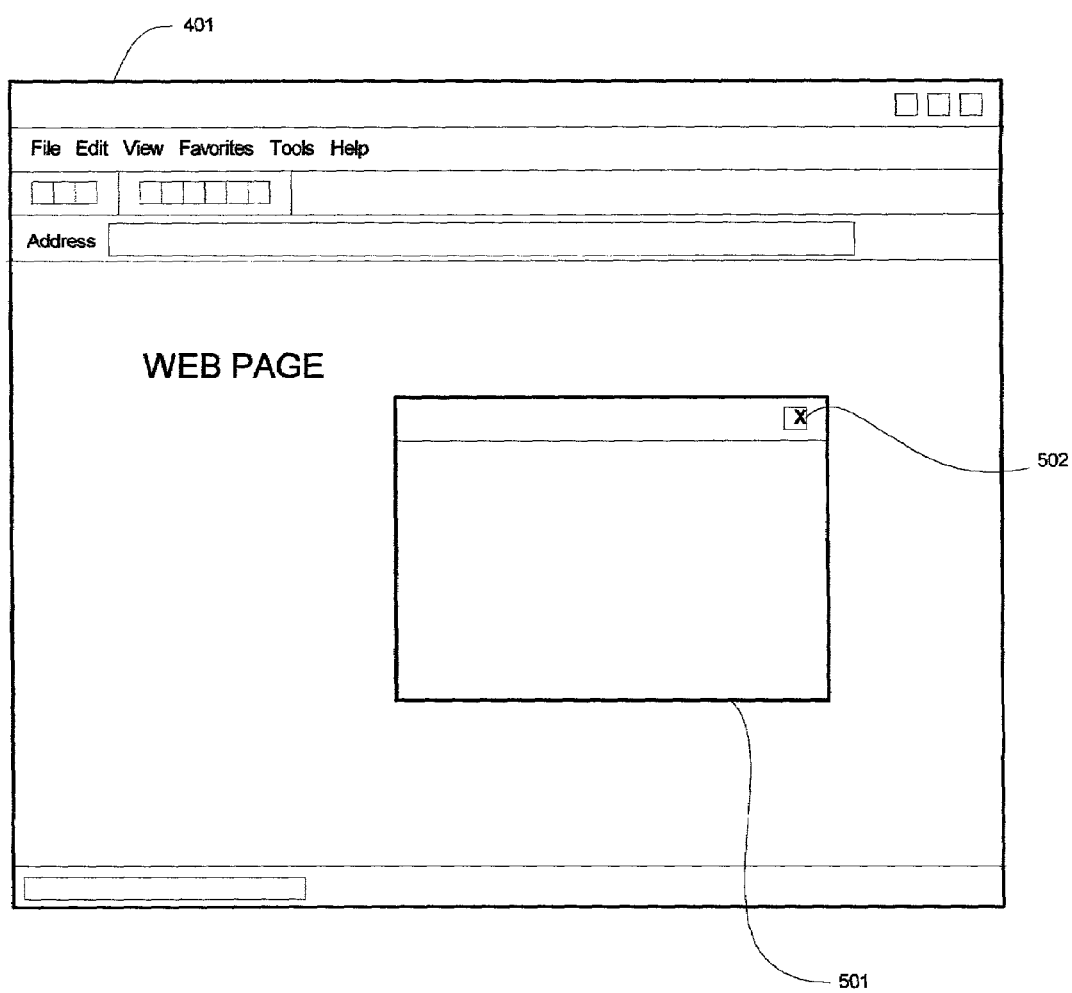
FIG. 5 shows a schematic representation of an example bad window.

In one embodiment, rules list 310 includes rules for identifying bad windows based on their attributes. The attributes of a window may be obtained by window analyzer 308 from web browser 302. Examples of window attributes that may be used to identify a bad window include menu bars and tool bars. In one embodiment, a new window that does not have a menu bar or a tool bar is deemed to be a bad window. Such a window is schematically depicted in FIG. 5 as a window 501. As is typical of bad windows such as pop-ups and pop-unders, window 501 has a remove button 502 but does not have a menu bar or a tool bar. As can be appreciated, rules list 310 may be updated to remove or modify the rule on menu/tool bar in applications where good windows also do not have a menu/tool bar.

In one embodiment, rules list 310 includes a rule that new windows navigating to a blank page, commonly referred to as "About:Blank," are deemed to be bad windows. Some bad windows are opened to a blank page (rather than to an HTML page on a remotely located web server) in order to speed up the opening of the window. This allows the bad window to be created fast enough such that it can be hidden under other windows without the user noticing it. Content, which is typically but not necessarily some form of advertising, is then included in the blank page using a script.

In one embodiment, rules list 310 includes a rule that new windows designated to be displayed under other windows (e.g., pop-unders) are deemed to be bad windows.

In one embodiment, rules list 310 includes a rule that new windows launched when a user navigates out of a web site or web page are deemed to be bad windows. Using Microsoft Internet Explorer™ web browser as an example, listener 306 receives a NewWindow2 event notification when a new window is about to be launched. Listener 306 also receives a DocumentComplete event notification when a web page has been completely loaded and initialized, and a BeforeNavigate2 event notification before navigation occurs. When listener 306 receives a NewWindow2 after receiving a DocumentComplete but before receiving a BeforeNavigate2, window analyzer 308 presumes that the new window being launched is due to the user leaving the web site.

In one embodiment, rules list 310 includes a rule that new windows launched shortly (e.g. within 2 seconds) after a main browser window changes are deemed to be bad windows. The amount of time for waiting for the launching of a new window may be varied depending on implementation. A change in the main browser window may be detected by comparing its URL or HTML content. The idea behind this rule is that a new window appearing shortly after a main browser window has changed is likely due to the user navigating to another web page or web site. Thus, there is a good chance that the new window is a bad window (e.g., pop-up or pop-under).

In one embodiment, rules list 310 includes a rule that new windows launched by a window that has been closed are deemed to be bad windows. The launching of a new window by another window, also referred to as spawning, is reported by a browser 302 as part of its general event notification. The newly launched window is identified and then prevented from being displayed. For example, if a WindowA closes and launches WindowB before disconnecting, the following sequence of events occur:

WindowA CLOSE
WindowA NewWindow (for WindowB)
WindowA DISCONNECT

In the above example, WindowB is deemed to be a bad window and accordingly blocked by window analyzer 308.

In one embodiment, rules list 310 also includes rules for determining whether a window is a good window. Good window rules take priority over bad window rules; that is, a window that is deemed to be a good window is allowed to be displayed even if that window is deemed to be bad. For example, a window that has no menu bar or tool bar will be displayed if that window is deemed to be a good window. The use of good window rules, although not necessary to the present invention, allows a window-blocking computer program to be optimized. That is, instead of indiscriminately blocking all kinds of bad windows, good window rules allow for exceptions that help fine tune the window blocking process. Therefore, classifying a window as a good window (using good window rules) or as a bad window (using bad window rules) allows for the blocking of the right amount and type of window for a given application.

In one embodiment, rules list 310 includes a rule that a new window initiated by the user is deemed to be a good window. This rule is referred to as the "user-initiated" rule. Examples of user-initiated windows include those launched when the user clicks on a hyperlink, selects to open a new window from a menu, interacts with a hyperlink, etc. The user-initiated rule allows bad windows to be blocked while minimizing interference with a user's normal browsing activities.

A user may initiate a new window by clicking on an element of an HTML document such as, for example, a hyperlink. The hyperlink may be in the form of a button or highlighted text. When the user clicks on a hyperlink, a new window is launched and allowed to be displayed.

In the Internet Explorer™ web browser, for example, web browser API 304 may register with an HTML document displayed on a window as soon as a NavigateComplete event notification is received from the web browser. This allows hooking into the HTML document. Thereafter, when the user clicks on the HTML document, listener 306 would get notification of the clicking event and, in version 5 or higher of the Internet Explorer™ web browser, the element that the user clicked on. The URL associated with the clicked element is stored in a window cache 316, and then compared to the URL of any new window. When the URL of a new window matches that of an element previously clicked on by the user, the new window is deemed to be a user-initiated window and accordingly not blocked. In situations where the URL of an element is not detectable (e.g., when the element calls a script), any new window launched within a short period of time (e.g., two seconds) after the user clicked on the element is deemed to be a user-initiated window and accordingly not blocked.

A user may initiate a new window from a menu choice. In the Internet Explorer™ web browser, for example, pointing the cursor on a hyperlink and pressing the right mouse button displays a menu which includes a selection choice that reads: "Open In New Window". Selecting "Open In New Window" launches a new window that is allowed to be displayed.

The user may also initiate a new window by interacting with a hyperlink. In the Internet Explorer™ web browser, for example, placing a cursor on a hyperlink displays on a status bar (e.g., see status bar 406 of FIG. 4) the URL pointed to by the hyperlink. URLs appearing on the status bar may be temporarily stored on window cache 316. When a URL appears on the status bar, window analyzer 308 presumes that the user is interested in any window navigating to that URL. Accordingly, new windows navigating to URLs that previously appeared on the status bar are deemed to be user-initiated and allowed to be displayed.

In one embodiment, rules list 310 includes a rule that a new window appearing when the main browser window has not changed for some time (e.g., 30 seconds) is deemed to be a good window. The amount of time for waiting for the changing of the main browser window may be varied depending on implementation. This rule is based on the assumption that most bad windows appear shortly after a user has navigated to a web site. If the user has not been navigating to other web sites, as is the case when the main browser window has not changed for some time, there is a good chance that any new window is probably user-initiated and should not be blocked.

In one embodiment, rules list 310 includes a rule that a new window appearing again after it was recently blocked is deemed to be a good window. The idea behind this rule, referred to as the "two-times-in-a-row rule", is that a window appearing again a second time within a predetermined period (e.g., 10 seconds) may be a user-initiated window that was inadvertently blocked; the amount of time for waiting for the launching of the second window may be varied depending on implementation. One way of determining whether two windows are the same is by examining their URLs. If two windows have the same URL, window analyzer 308 presumes the two windows to be the same. The two-times-in-a-row rule works as a back-up mechanism to the user-initiated rule, further optimizing the blocking of bad windows while minimizing impact to normal user activity. The two-times-in-a-row rule may be removed in applications where it allows too many bad windows to be displayed. The two-times-in-a-row rule may also be removed in applications where the user-initiated rule is quite effective in detecting user-initiated windows.

In one embodiment, rules list 310 includes a rule that new windows containing a password or login field are deemed to be good windows and, accordingly, are not blocked.

In one embodiment, rules list 310 includes a rule that new windows originating from a secure domain are deemed to be good windows and, accordingly, are not blocked. One way of identifying a secure domain is by the scheme portion of its URL. As is well know, a URL can be broken down into the following parts:

<scheme>:<scheme-specific name>

An example scheme commonly used by secure domains is HTTPS (e.g., "https://creditcards.com"), which refers to Hypertext Transfer Protocol encrypted over Secure Sockets Layer (SSL). Thus, windows originating from a domain using an HTTPS scheme are not blocked. As can be appreciated, other ways of identifying a secure domain may also be used without detracting from the merits of the present invention.

As shown in FIG. 3, a memory 203A may also include an exclusion list 312. An exclusion list 312 may be a text file stored in a mass storage device and then loaded into a memory 203A, for example. An exclusion list 312 may be in any computer-readable format or data structure. Advantageously, an exclusion list 312 is implemented as a separate module so that it may be updated without having to update the entirety of a computer program employing the list.

In one embodiment, exclusion list 312 includes a list of domain names (e.g., www.store.com/...) where bad windows will not be blocked regardless of the rules in rules list 310. That is, exclusion list 312 takes priority over rules list 310. This allows all types of windows, whether good or bad, from a particular domain to be displayed. For example, if www.store.com is on exclusion list 312, the blocking of bad windows is disabled when the user is browsing anywhere in the domain of www.store.com.

In one embodiment, exclusion list 312 includes a locally-managed exclusion list 312A and a remotely-managed exclusion list 312B. Exclusion list 312A includes a list of domain names entered by a user. As can be appreciated, exclusion list 312A provides the user some control on the window-blocking process.

Figure 6A:
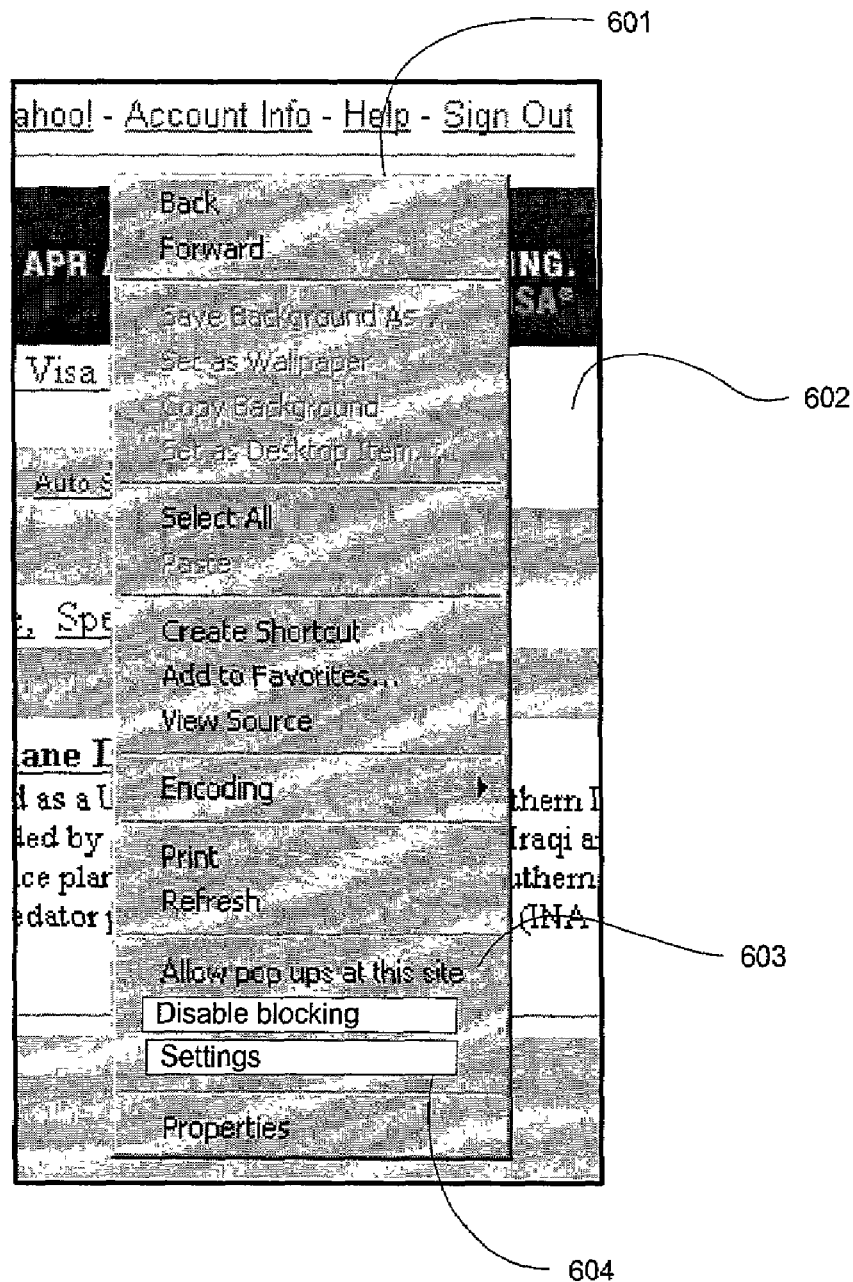
FIGS. 6A, 6B, and 6C show various user interfaces for adding a domain name in an exclusion list.

The user may enter a domain name into exclusion list 312A several ways; the manner in which domain names are entered into an exclusion list does not affect the efficacy of the present invention. One way is to present a menu to the user when she right-clicks (i.e., presses the right mouse button) on a web page. Referring to FIG. 6A, a menu 601 is displayed when the user right-clicks on a web page 602. Selecting choice 603 from menu 601 adds the domain name of web page 602 to exclusion list 312A.

Figure 6B:
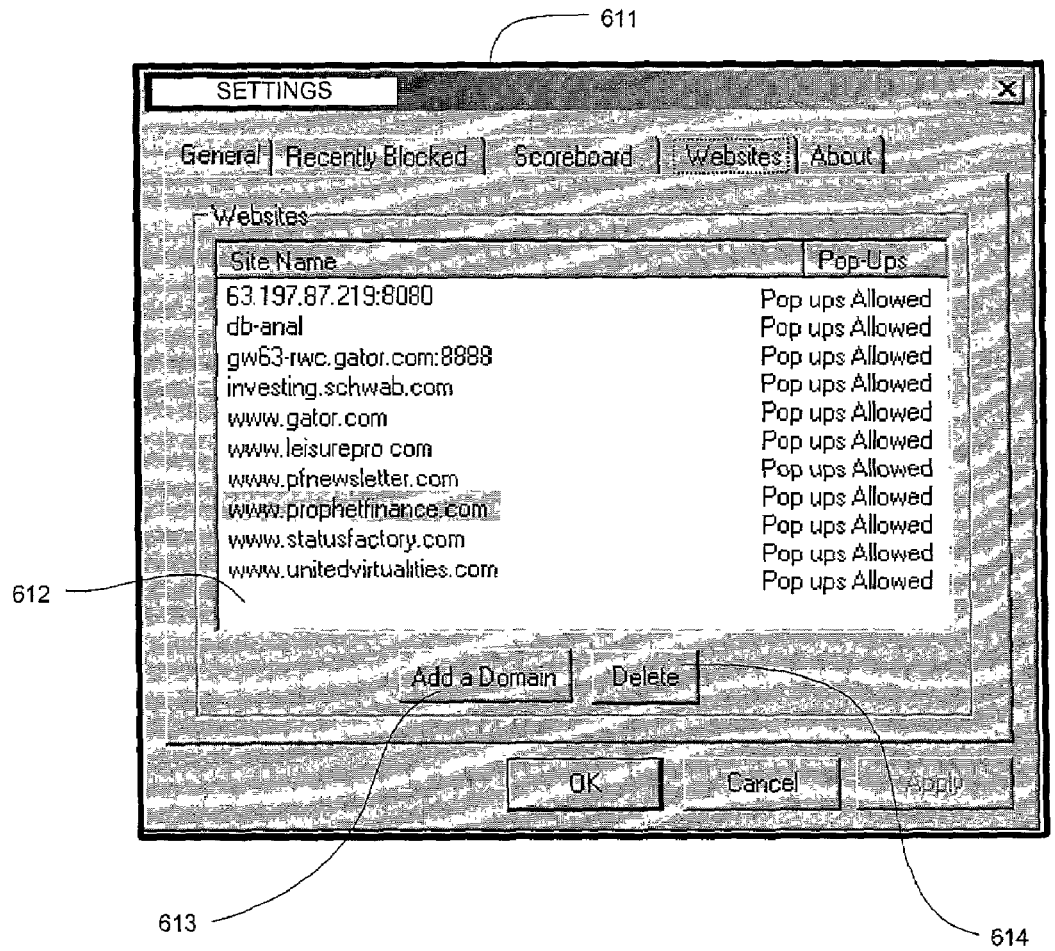
Figure 6C:
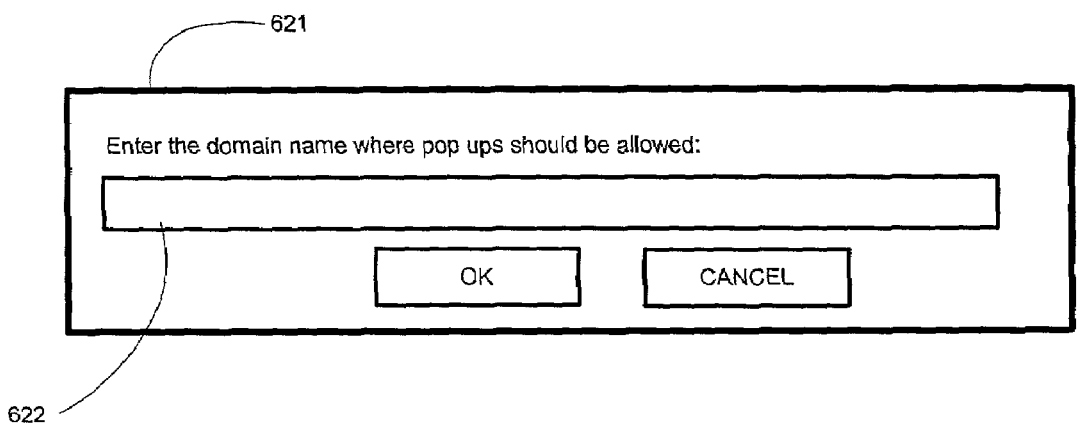

A dialog box may also be used for adding or removing a domain name from exclusion list 312A. Such a dialog box may be invoked by selecting choice 604 from menu 601, for example. Referring to FIG. 6B, a dialog box 611 includes a text box 612 listing all domain names in exclusion list 312A. Selecting a domain name from text box 612 and clicking on delete button 614 will remove the selected domain name from exclusion list 312A (and from text box 612). Clicking on add button 613 brings up a dialog box 621 shown in FIG. 6C, where a domain name to be added may be entered on text input field 622. The entered domain name is added to exclusion list 312A and appears on text box 612.

Remotely-managed exclusion list 312B includes a list of domain names downloadable from a support server computer 103. Window-blocking is not performed in domains included in an exclusion list 312B. This allows a vendor (who may be the operator of a support server computer 103) to offer a window-blocking computer program at no cost to users, so long as the program does not block windows from the vendor or partner web sites. That is, a vendor may choose to include in an exclusion list 312B domain names of partners who may be subsidizing the development and maintenance of the window-blocking computer program. As can be appreciated, a window-blocking computer program in accordance with the present invention will still block a substantial amount of bad windows even with a remotely-managed exclusion list 312B. The window-blocking computer program will block a substantial amount of bad windows, while displaying a relatively small amount of its own windows in return. Of course, exclusion list 312A and/or 312B may be omitted from memory 203A depending on implementation.

As shown in FIG. 3, memory 203A further includes a support server interface 314. Support server interface 314 includes computer-readable program code for communicating with a support server computer 103. A window cache 316 provides a general buffer area where status bar information, window characteristics, URLs, values, HTML code of a web page, etc. may be temporarily stored.

A scorekeeper 318 includes computer-readable program code for gathering statistical information. Examples of statistical information tracked by scorekeeper 318 include the number of windows that have been blocked and the domains where windows have been blocked.

A UI manager 320 includes computer-readable program code for presenting various user interface components such as dialog boxes, message boxes, menus etc. to users.

Figure 7:
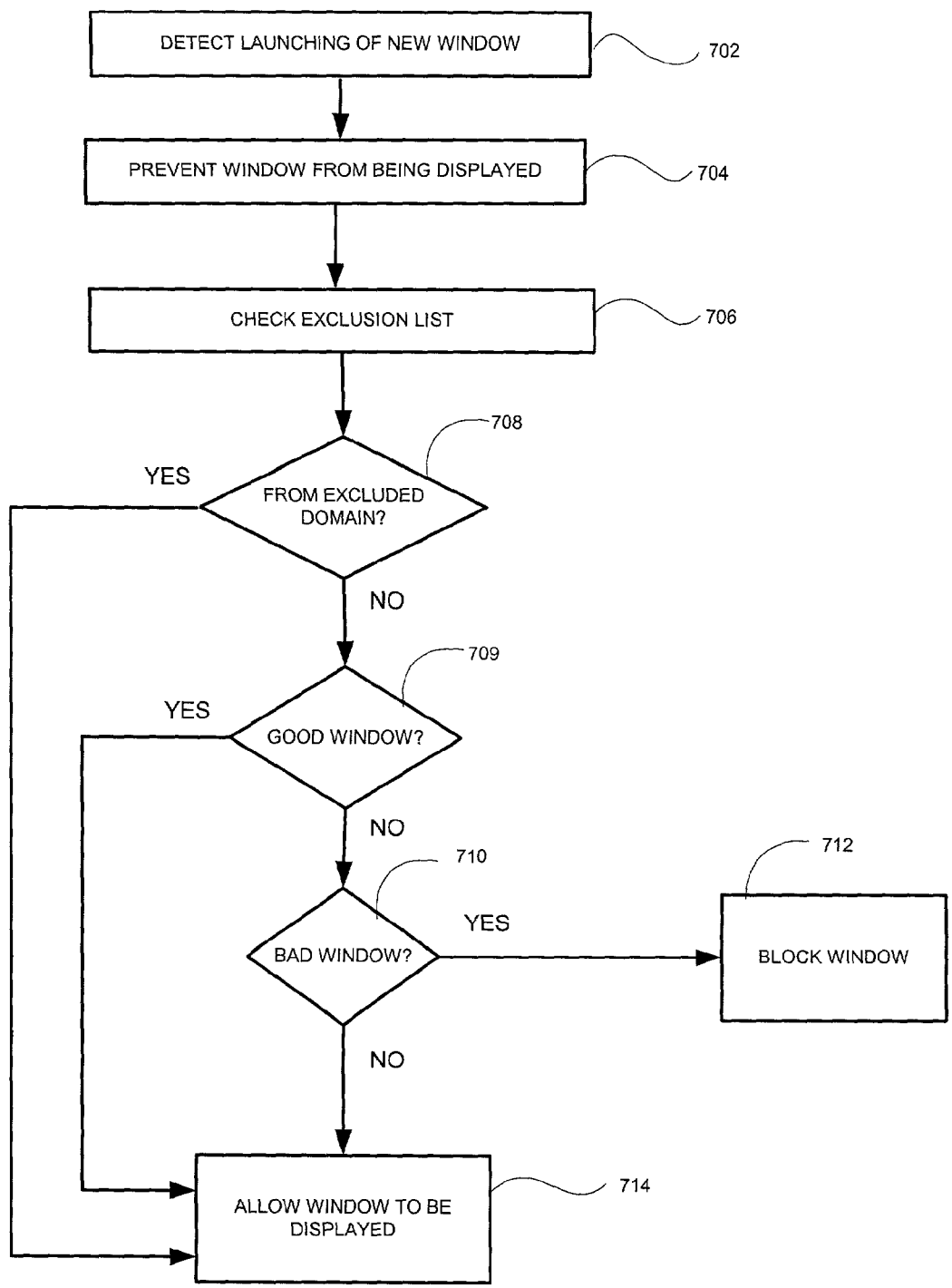
FIG. 7 shows a flow diagram of a method for processing windows in accordance with an embodiment of the present invention.

Referring now to FIG. 7, there is shown a flow diagram of a method for processing windows in accordance with an embodiment of the present invention. In action 702, listener 306 receives an event notification from web browser 302 that a new window is opening up. In action 704, the window is prevented from being displayed while window analyzer 308 examines the window. This gains some time for window analyzer 308, and also prevents the window from flickering in and out of the user's view if it turns out to be a bad window that has to be blocked. The window may be prevented from being displayed by turning OFF its visibility attribute. Another way is to move the window to a screen location not viewable by a user (e.g., move the window off-screen).

Continuing in action 706, window analyzer 308 consults an exclusion list 312 (i.e., 312A and/or 312B) to determine if the window is navigating to a domain where window blocking is not allowed. Because the window may be redirected to another domain on its way to its intended domain, window analyzer 308 also checks the domain where the window ended up to check if it is in an exclusion list 312.

In actions 708 and 714, the window is allowed to be displayed if it is on a domain included in an exclusion list 312. The window may be displayed by turning ON its visibility attribute and/or moving it back to its intended screen location.

In actions 709 and 714, the window is allowed to be displayed if window analyzer 308 determines that it is a good window.

Figure 8:
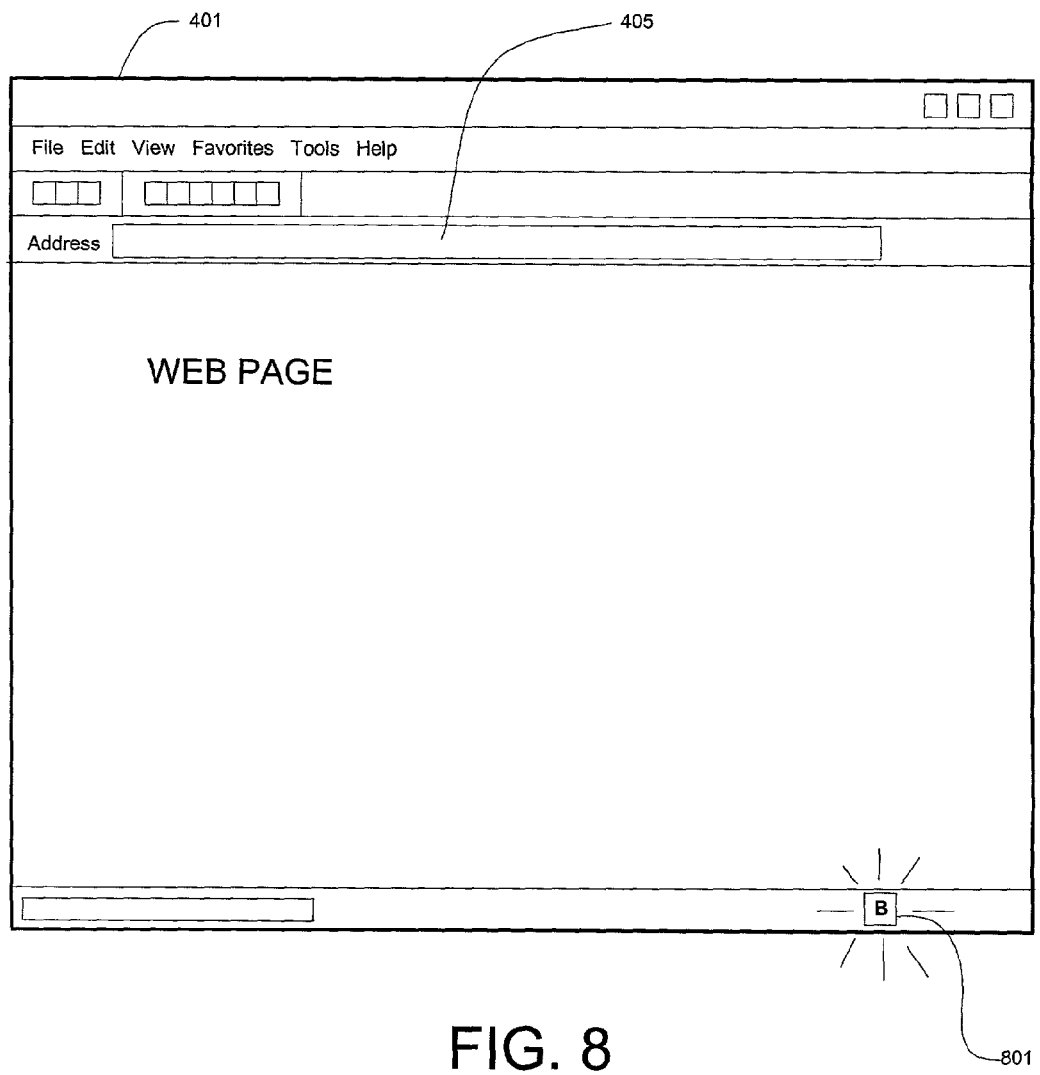
FIG. 8 shows a schematic representation of a blinking tray icon for alerting a user that a bad window has been blocked in accordance with an embodiment of the present invention.

In actions 710 and 712, the window is blocked if window analyzer 308 determines that it is a bad window. One way of blocking the window is to invoke a browser method to close the window. Another way of blocking the window is to hide it away from the user's view by keeping it invisible or off-screen. Hiding the window, instead of closing it, is preferable in applications where the user may want to review a list of blocked windows and selectively view those that are of interest to her. For example, a blinking tray icon such as icon 801 of FIG. 8 may be displayed to alert the user that bad windows have been blocked at the domain indicated in address window 405. Clicking on icon 801 may then bring up a dialog box (not shown) listing all the bad windows that have been blocked; clicking on a listed blocked window would then allow that window to be displayed.

Techniques for Defeating a Window-Blocking Mechanism

A technique for defeating window-blocking mechanisms (e.g., a window-blocking computer program) is generally desirable to those who deliver messages to users via pop-ups, pop-unders, and other types of windows. Such a technique may be implemented as computer-readable program code, referred to herein as "defeat code". The defeat code may be included in a web page, Java™ script, or Visual Basic™ script, for example. The defeat code may also be part of a computer program. As can be appreciated, a defeat mechanism may also be implemented in hardware or firmware.

One way of defeating window-blocking computer programs is to identify such programs and include them in a product list 322 (see FIG. 3). A human researcher may identify window-blocking computer programs by independent testing, reading trade journals, searching the Internet for information, etc. The names of the window-blocking computer programs, which may include their respective file names, are then entered into a product list 322. Product list 322 may then be installed on a client computer 101. Product list 322 may be updated from time to time to include newly identified window-blocking computer programs. In one embodiment, a defeat mechanism searches a client computer 101 for the presence of window-blocking computer programs identified in a product list 322. Of course, information in a product list 322 may also be embedded in a defeat code. When a window-blocking computer program is found, the defeat mechanism may then disable the program by initiating an uninstall, for example. The user's permission may be required for every window-blocking computer program to be disabled. The window-blocking computer program may also be disabled by closing the program or removing/altering its components such as registry entries, settings, configuration files, modules, and data files.

In one embodiment, a defeat mechanism may make a window-blocking computer program look like its malfunctioning to make the user uninstall the window-blocking computer program. For example, the defeat mechanism may indiscriminately close any new window to make the user believe that the window-blocking computer program is malfunctioning.

In one embodiment, a defeat mechanism incorporates a non-functional attribute to a window for the purpose of defeating a window-blocking computer program. In the present disclosure, the term "non-functional" includes that which is unnecessary, hidden, or dummy. For example, a defeat mechanism may launch a window with a non-functional menu bar or tool bar. That is, the defeat mechanism may incorporate a menu bar (or tool bar) to a window even though it does not provide any real function.

In one embodiment, a defeat mechanism launches a window multiple times for the purpose of defeating a window-blocking computer program.

In one embodiment, a defeat mechanism incorporates a non-functional field to a window for the purpose of defeating a window-blocking computer program. For example, a defeat mechanism may launch a window with a non-functional password field or login field (or the word "password" or "login", for example). That is, the defeat mechanism may incorporate a password field or login field to a window even though the window does not require a password or users to login.

In one embodiment, a defeat mechanism repeatedly turns ON the visibility attribute of a window for the purpose of defeating a window-blocking computer program. For example, a defeat mechanism may turn ON the visibility attribute of a window several times a second.

In one embodiment, a defeat mechanism repeatedly positions a window in a screen location viewable by a user for the purpose of defeating a window-blocking computer program. For example, a defeat mechanism may move the window to the same screen location several times a second.

In one embodiment, a defeat mechanism waits for a predetermined amount of time (e.g., 30 seconds) before launching a new window for the purpose of defeating a window-blocking computer program. The amount of time for waiting for the launching of a new window may be varied depending on implementation. For example, a defeat mechanism may delay the launching of a new window in order to make a window-blocking computer program assume that the new window is a user-initiated window.

In one embodiment, a defeat mechanism uses part of a domain name within the URL of a window for the purpose of defeating a window-blocking computer program. For example, when at "hooray.com", a window served from a server other than a hooray.com server may have a URL that reads:

http://www.badads.com/ad/14223312/hooray.com.

This will defeat a window-blocking computer program that allows all windows from a specific domain (e.g., hooray.com), and uses a simple URL scan to look for matching domain names.

In one embodiment, a defeat mechanism intercepts an event to close a window. Instead of letting the window close, the defeat mechanism hides the window or moves it off screen. Thereafter, the defeat mechanism launches a bad window. This technique will defeat window-blocking computer programs that look for bad windows launched when a user exits a web site or web page, for example.

In one embodiment, a defeat mechanism momentarily changes the status bar of a browser to reflect a bad window's URL. This technique will defeat window-blocking computer programs that monitor the status bar.

In one embodiment, a defeat mechanism inputs keystroke combinations into the browser or triggers mouse events to fool a window-blocking computer program into believing that a bad window is user-initiated.

In one embodiment, a defeat mechanism sets the title of a bad window such that a window-blocking computer program that examines the title bar is defeated. For example, if a window-blocking computer program does not block windows whose title bar reflects "yahoo", the defeat mechanism may change the title bar of a bad window to "yahoo" whether or not the bad window is served from a yahoo.com server.

In one embodiment, a defeat mechanism uses a single web server computer having a rotating list of messages (e.g., advertisements) to serve a bad window. Successive calls to the same URL would thus result in different messages being displayed in different windows having the same URL. This technique will defeat window-blocking computer programs that employ a two-times-in-a-row rule.

In one embodiment, a defeat mechanism serves bad windows from a secure domain to defeat window-blocking computer programs that allow all windows from secure domains. For example, a defeat mechanism may originate bad windows from an SSL server.

In one embodiment, a defeat mechanism alters an exclusion list or rules list of a window-blocking computer program to defeat the program. For example, a defeat mechanism may surreptitiously include a domain name in an exclusion list or a rule in the rules list. The defeat mechanism may also surreptitiously remove or replace a list employed by a window-blocking computer program.

In one embodiment, a defeat mechanism displays messages on a window that is not detectable or hookable using a conventional browser API (i.e., browser API commercially available for a specific browser). For example, a defeat mechanism may launch a non-browser window (e.g., a normal window object), and embed a browser control in the window. The defeat mechanism may then turn OFF an attribute commonly known as "RegisterAsBrowser" to prevent other programs, such as a window-blocking computer program, from detecting the window or closing the window by hooking into the embedded browser control.

In one embodiment, a defeat mechanism displays a message in a window created using proprietary programming techniques to prevent other programs, such as a window-blocking computer program, from detecting or influencing the window. For example, instead of directly using HTML with a browser application or control, a custom HTML display engine may be used to interpret HTML code to build a graphical display for a message. Because the resulting graphical display is not a browser application and does not include an embedded browser control, it cannot be influenced using conventional browser API. The defeat mechanism may also use a proprietary language, instead of HTML, to create a window.

In one embodiment, a defeat mechanism displays messages on the same window in-between navigations to defeat a window-blocking computer program. For example, a message may be displayed on a main browser window. When a user clicks a hyperlink to go to another web page, the defeat mechanism may then display another message on the same main browser window for a few seconds before navigating to the new web page. This prevents a window-blocking computer program from suppressing the message.

Information Regarding other Computer Programs

In accordance with an embodiment of the present invention, window analyzer 308 may further include computer-readable program code for identifying windows that offer products to users (hereinafter "product-offering windows"). In some embodiments of the present invention, product-offering windows are deemed to be good windows and not blocked by window analyzer 308.

In one embodiment, window analyzer 308 determines whether a window is offering a downloadable program by searching the content of the window for text strings such as "download" or a company/product name. Window analyzer 308 may also look for the presence of authentication information such as a digital certificate and associated CLSID (Class ID) in the HTML code of the window. As is well known, a CLSID is a universally unique identifier (UUID) that identifies a type of Component Object Model (COM) object. Each type of COM object item has its CLSID in the registry so that it can be loaded and used by other applications. For example, a spreadsheet may create worksheet items, chart items, and macrosheet items. Each of these item types has its own CLSID that uniquely identifies it to the system. In this embodiment of the present invention, CLSIDs are used to identify an installable computer program that may be offered through a browser for download and installation.

As shown in FIG. 3, a memory 203A may further include a product list 322 containing a list of computer programs and their respective CLSIDs. Product list 322 may be a text file stored in a mass storage device and then loaded into a memory 203A, for example. Product list 322 may be in any computer-readable format or data structure. Advantageously, product list 322 is implemented as a separate module so that it may be updated without having to update the entirety of a computer program employing product list 322.

In one embodiment, product list 322 includes a description of computer programs to aid users in deciding whether they should install a computer program being offered to them. The descriptions may be gathered by a human researcher by reading other reviews of the computer program or by independent testing. Thereafter, the descriptions are entered into a product list 322, where they are matched with corresponding CLSIDs. Product list 322 may be updated from time to time by downloading a new product list 322 from a support server computer 103.

Figure 9A:
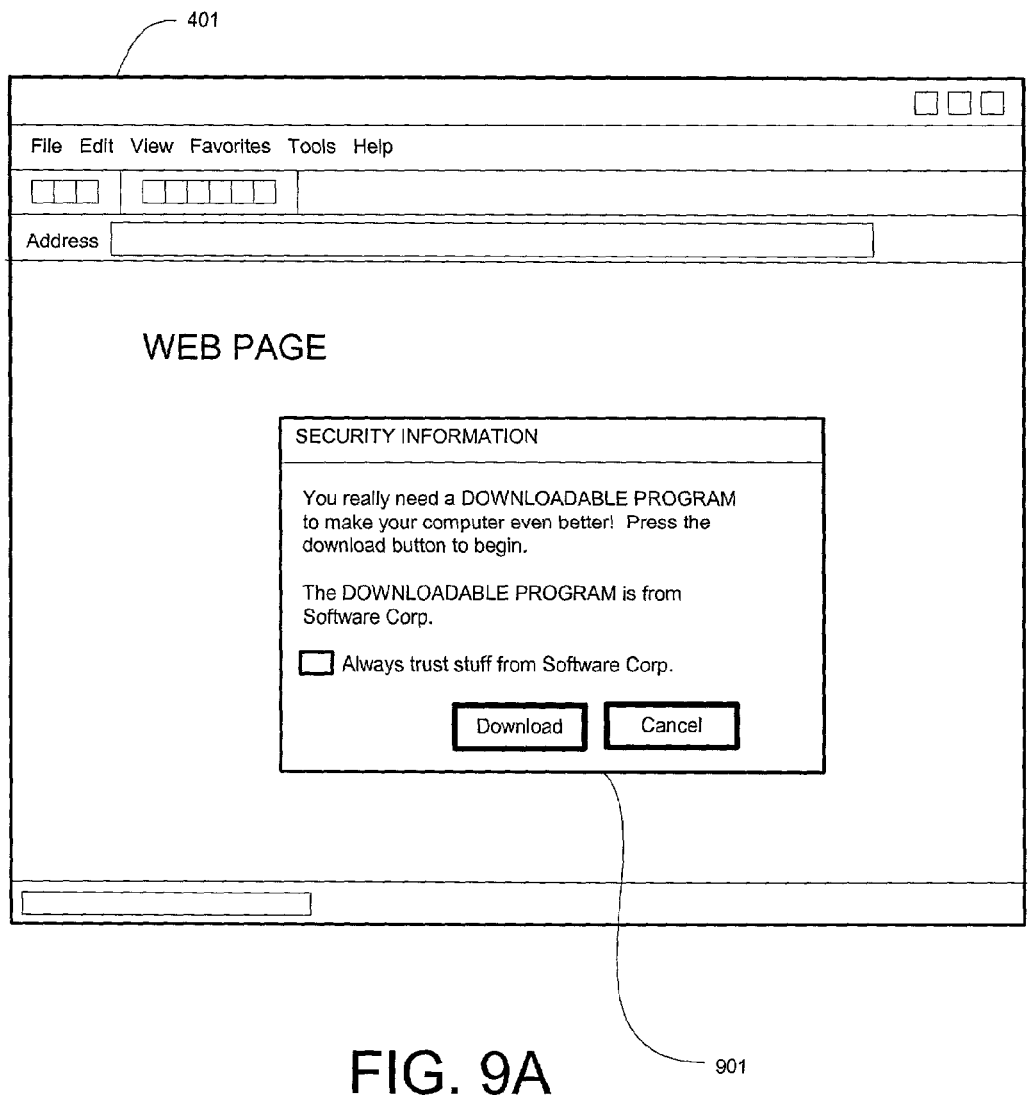
FIGS. 9A and 9B schematically illustrate the presentation of a window containing third-party product information in accordance with an embodiment of the present invention.
Figure 9B:
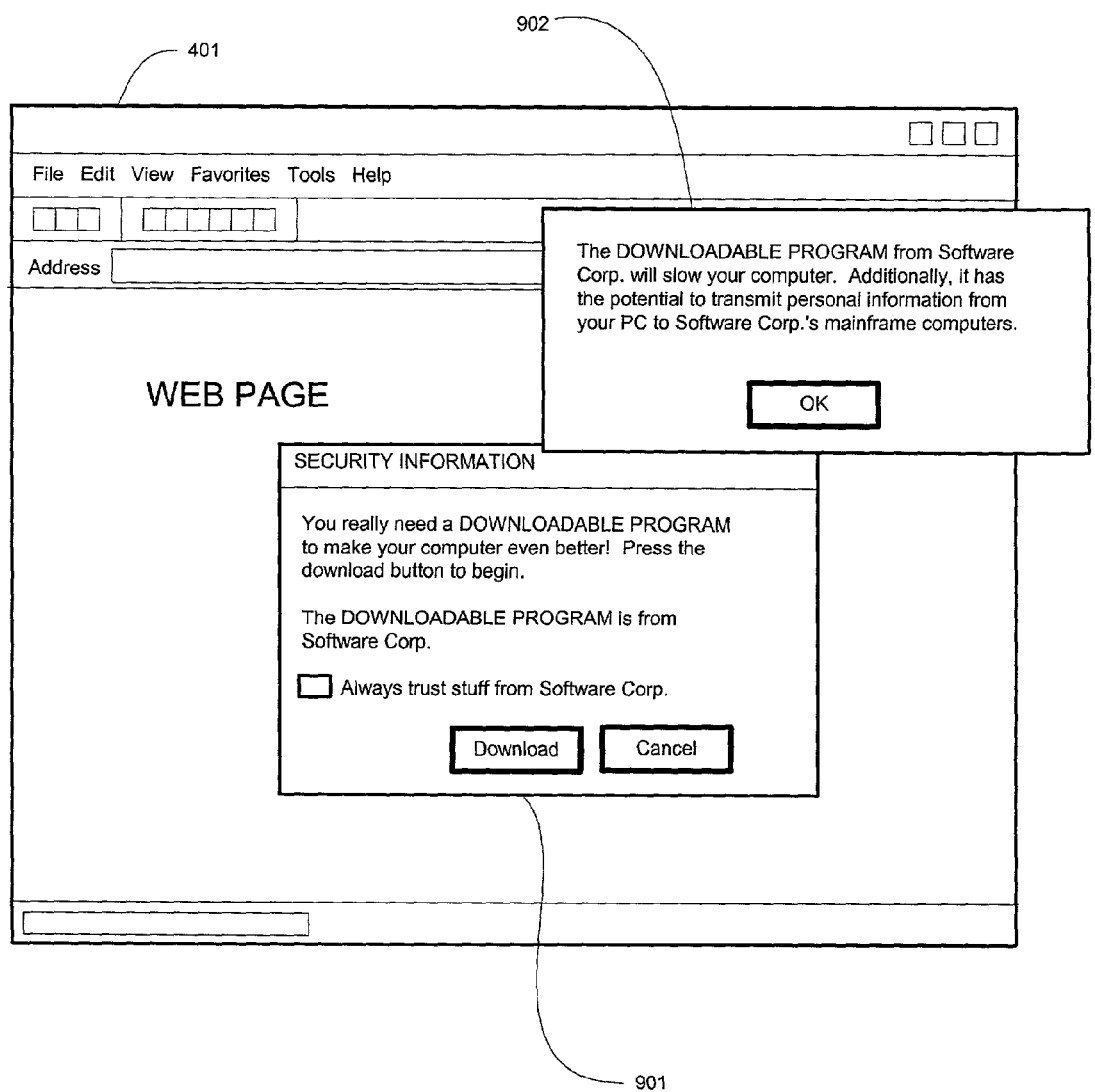

FIG. 9A schematically illustrates a dialog box 901 offering a downloadable computer program to a user. From a CLSID included in the HTML code that generated dialog box 901, window analyzer 308 detects dialog box 901 as offering a downloadable computer program from a specific vendor. Accordingly, window analyzer 308 retrieves a description for the detected CLSID from product list 322, and then commands UI manager 320 to display a message box 902 containing the description as shown in FIG. 9B. As can be appreciated, third-party information about the computer program, such as that provided by message box 902, allows the user to make a more meaningful decision as to whether to install the computer program on her computer.

Distribution of Computer Programs

A computer program in accordance with embodiments of the present invention may be distributed to users several ways. One way is to distribute the computer program on removable storage media such as a CD-ROM, for example. Another way is to offer the computer program for download from a server computer such as a web server computer 102 or a support server computer 103. Another way is to bundle the computer program with a second computer program; the computer program may be offered to the user while the second computer program is being processed for installation on the user's computer.

Figure 10:
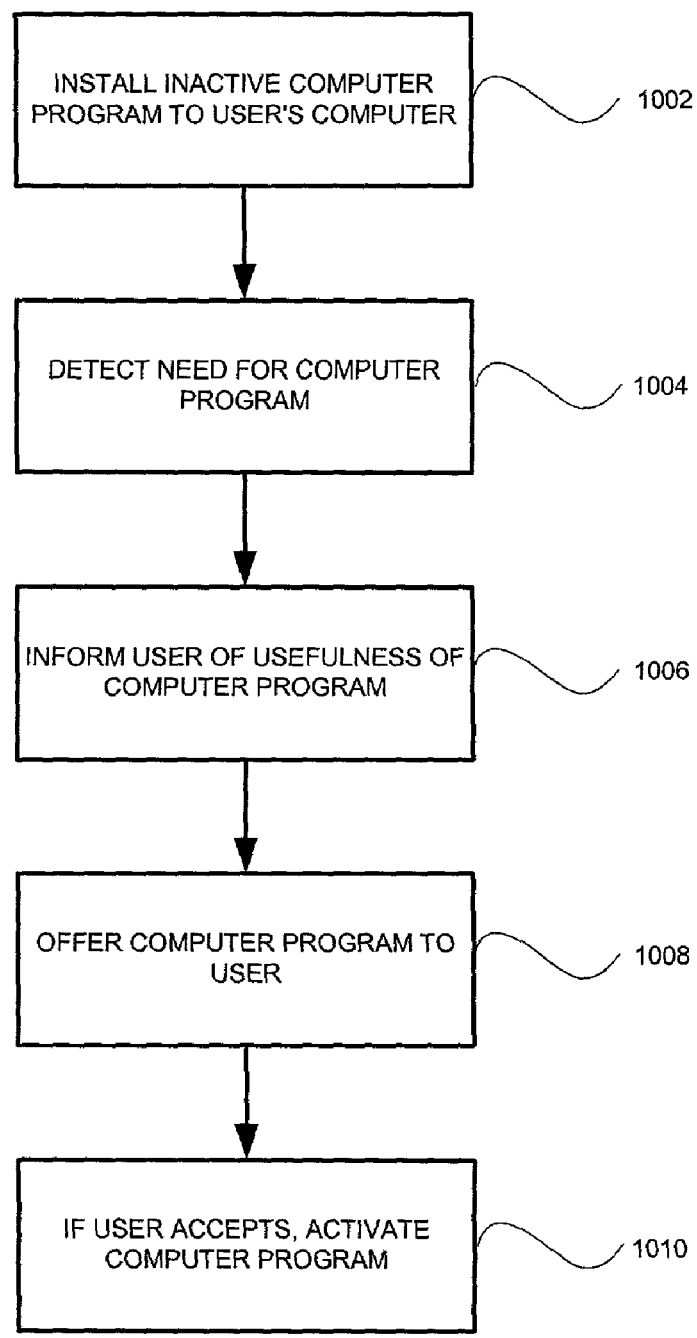
FIG. 10. shows a flow diagram of a method for distributing a computer program in accordance with an embodiment of the present invention.

FIG. 10 shows a flow diagram of a method for distributing a computer program in accordance with an embodiment of the present invention. While the method of FIG. 10 will now be described in connection with a window-blocking computer program, those of ordinary skill in the art will appreciate that the method may be used to distribute any type of computer program.

In action 1002, a computer program is installed on a client computer 101. Preferably, the computer program will only have minimum functionality to minimize its impact on the storage and computing resources of the client computer. For example, an exclusion list 312 does not have to be installed if the program is a window-blocking computer program. Also, the computer program is installed but remains partially disabled (i.e., inactive) until the user accepts it. For a window-blocking computer program, window analyzer 308 detects bad windows and good windows but will not block any window.

In action 1004, the user's need for the computer program is detected. In the window-blocking computer program example, scorekeeper 318 keeps track of the number of bad windows detected by window analyzer 308.

In actions 1006 and 1008, the user is informed of the usefulness of the computer program, and is thereafter offered the computer program. In the window-blocking computer program example, window analyzer 308 commands UI manager 320 to display the results of scorekeeper 318 once the number of detected bad windows reaches a certain threshold (e.g., 2 bad windows in a given session). The threshold may be varied depending on implementation. An example message box that may be displayed to the user may read:

"You have received 2 bad windows since you started browsing today. I can make bad windows automatically disappear so they can't bug you. Press the ACTIVATE button to say goodbye to bad windows."

A similar message reminding the user of the usefulness of the computer program may also be displayed if the user installs the computer program and decides to uninstall it later on. As can be appreciated, offering a computer program when the user needs it most increases the chance of the user accepting the program; reminding the user of the efficacy of the computer program at a time when the user is trying to uninstall it increases the chance of the user keeping the program.

In action 1010, the computer program is enabled (i.e., fully activated) if the user decides to accept it. At this point, the entirety of the computer program may be installed in the user's computer if needed. In the window-blocking computer program example, exclusion list 312 may be downloaded to the user's client computer 101 if the list is not already installed.

An improved technique for processing windows has been disclosed. While specific embodiments have been provided, it is to be understood that these embodiments are for illustration purposes and not limiting; many additional embodiments will be apparent to persons of ordinary skill in the art reading this disclosure. For example, while the following description uses a computer network such as the Internet as an example, persons of ordinary skill in the art will appreciate that the present invention also applies to windows that are generated by a local program on a non-networked computer. Thus, the present invention is limited only by the following claims.

What is claimed is:

1. A method of providing product information to a user, the method to be performed by computer-readable program code running in a computer, the method comprising:

detecting an occurrence of a first window in the computer;

determining if the first window includes an offer to download a computer program; identifying the computer program, including looking up in a product list a class identification (CLSID) of the computer program to be downloaded; and displaying a second window in the computer, the second window including third party information about the computer program.

2. The method of claim 1 wherein the first window is launched by a web browser.

3. The method of claim 1 wherein the product list is updateable by downloading a new product list from a remote computer to the computer.

4. A computer memory comprising:

a listener, the listener including computer-readable program code for detecting opening of a new window;

a product list, the product list including a list of computer programs, unique identifiers for the computer programs and a description of each of the computer programs, the description of each of the computer programs comprising third-party information that helps users decide whether they should install a computer program being offered for download;

a window analyzer, the window analyzer including computer-readable program code for detecting whether the new window is offering a computer program listed in the product list for download;

a user interface manager, the user interface manager including computer-readable program code for displaying third party information about the computer program offered in the new window and listed in the product list.

* * * * *